United States Patent
Miki et al.

(10) Patent No.: US 9,887,417 B2
(45) Date of Patent: Feb. 6, 2018

(54) COMPOSITE ACTIVE MATERIAL, SOLID STATE BATTERY AND METHOD FOR PRODUCING COMPOSITE ACTIVE MATERIAL

(71) Applicant: TOYOTA JIDOSHA KABUSHIKI KAISHA, Toyota-shi, Aichi (JP)

(72) Inventors: Nariaki Miki, Susono (JP); Masahiro Iwasaki, Susono (JP); Hajime Hasegawa, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 16 days.

(21) Appl. No.: 14/410,542

(22) PCT Filed: Jun. 26, 2013

(86) PCT No.: PCT/JP2013/067445
§ 371 (c)(1),
(2) Date: Dec. 22, 2014

(87) PCT Pub. No.: WO2014/003036
PCT Pub. Date: Jan. 3, 2014

(65) Prior Publication Data
US 2015/0311507 A1 Oct. 29, 2015

(30) Foreign Application Priority Data
Jun. 29, 2012 (JP) .................. 2012-147010

(51) Int. Cl.
*H01M 4/36* (2006.01)
*H01M 4/62* (2006.01)
(Continued)

(52) U.S. Cl.
CPC .......... *H01M 4/366* (2013.01); *H01M 4/131* (2013.01); *H01M 4/625* (2013.01);
(Continued)

(58) Field of Classification Search
CPC ...... H01M 4/366; H01M 4/625; H01M 4/131; H01M 4/134; H01M 10/052; H01M 10/058
See application file for complete search history.

(56) References Cited

U.S. PATENT DOCUMENTS

2002/0127404 A1  9/2002  Veerasamy
2002/0197530 A1* 12/2002  Tani .................... H01M 4/0416
                                                429/218.2
(Continued)

FOREIGN PATENT DOCUMENTS

CN  101796671 A  8/2010
CN  101841037 A  9/2010
(Continued)

*Primary Examiner* — Kenneth J Douyette
(74) *Attorney, Agent, or Firm* — Oliff PLC

(57) ABSTRACT

The problem to be solved by the present invention is to provide a composite active material having favorable electron conductivity. The present invention solves the problem by providing a composite active material comprising an active material, a coat layer with an average thickness of less than 100 nm, formed on a surface of the active material and composed of an ion conductive oxide, and carbon particles penetrating the coat layer, formed on a surface of the active material.

3 Claims, 5 Drawing Sheets

(51) Int. Cl.
*H01M 4/13* (2010.01)
*H01M 10/052* (2010.01)
*H01M 4/131* (2010.01)
*H01M 10/058* (2010.01)
*H01M 4/02* (2006.01)
*H01M 10/0562* (2010.01)
*H01M 4/04* (2006.01)

(52) U.S. Cl.
CPC ....... *H01M 10/052* (2013.01); *H01M 10/058* (2013.01); *H01M 4/0471* (2013.01); *H01M 10/0562* (2013.01); *H01M 2004/021* (2013.01); *H01M 2220/30* (2013.01)

(56) References Cited

U.S. PATENT DOCUMENTS

| | | | | |
|---|---|---|---|---|
| 2004/0151837 | A1* | 8/2004 | Morita | C01B 31/02 427/372.2 |
| 2005/0074672 | A1* | 4/2005 | Matsubara | H01M 4/0421 429/231.95 |
| 2006/0237697 | A1* | 10/2006 | Kosuzu | H01M 4/134 252/500 |
| 2009/0162750 | A1 | 6/2009 | Kawakami et al. | |
| 2010/0233545 | A1 | 9/2010 | Sano et al. | |
| 2010/0310939 | A1* | 12/2010 | Yoshida | H01M 4/366 429/231.8 |
| 2011/0045348 | A1 | 2/2011 | Kubo et al. | |
| 2012/0107686 | A1* | 5/2012 | Ryu | C01G 53/42 429/215 |
| 2014/0057180 | A1 | 2/2014 | Iwasaki | |
| 2014/0065298 | A1 | 3/2014 | Yanagisawa et al. | |

FOREIGN PATENT DOCUMENTS

| | | |
|---|---|---|
| JP | A-2006-107963 | 4/2006 |
| JP | 2009-266728 A | 11/2009 |
| JP | A-2010-73539 | 4/2010 |
| JP | 2010-218830 A | 9/2010 |
| JP | 2011-238523 A | 11/2011 |
| JP | 2012-234648 A | 11/2012 |
| WO | 2009/031036 A3 | 5/2009 |
| WO | WO 2012/157046 A1 | 11/2012 |

* cited by examiner

COMPOSITE ACTIVE MATERIAL, SOLID STATE BATTERY AND METHOD FOR PRODUCING COMPOSITE ACTIVE MATERIAL

TECHNICAL FIELD

The present invention relates to a composite active material having favorable electron conductivity.

BACKGROUND ART

In accordance with a rapid spread of information relevant apparatuses and communication apparatuses such as a personal computer, a video camera and a portable telephone in recent years, the development of a battery to be utilized as a power source thereof has been emphasized. The development of a high-output and high-capacity battery for an electric automobile or a hybrid automobile has been advanced also in the automobile industry. A lithium battery has been presently noticed from the viewpoint of a high energy density among various kinds of batteries.

Here, organic liquid electrolyte using a flammable organic solvent is used for a conventionally commercialized lithium battery, so that the installation of a safety device for restraining temperature rise during a short circuit and the improvement in structure and material for preventing the short circuit are necessary therefor. On the contrary, a solid state battery such that the liquid electrolyte is replaced with a solid electrolyte is conceived to intend the simplification of the safety device and be excellent in production cost and productivity for the reason that the flammable organic solvent is not used in the battery.

In the field of such a solid state battery, an attempt to intend the performance improvement of the battery is offered while noticing an interface between an active material and an electrolyte material. For example, in Patent Literature 1, an electrode body (a cathode layer) containing a cathode active material coated with lithium niobate and a solid electrolyte including a sulfide is disclosed. In addition, in Patent Literature 1, it is disclosed that an electrode body may contain a conductive agent such as acetylene black and Ketjen Black.

CITATION LIST

Patent Literature

Patent Literature 1: Japanese Patent Application Publication (JP-A) No. 2010-073539

SUMMARY OF INVENTION

Technical Problem

A reaction between an active material and a solid electrolyte material may be restrained by providing a coat layer composed of an ion conductive oxide such as lithium niobate on the surface of the active material. On the other hand, it is important for efficiently causing a battery reaction that an electron may move smoothly on the surface of the active material. However, an ion conductive oxide such as lithium niobate is so low in electron conductivity that the use of the active material coated with a coat layer increases resistance of a battery.

The present invention has been made in view of the actual circumstances, and the main object thereof is to provide a composite active material having favorable electron conductivity.

Solution to Problem

In order to solve the problem, the present invention provides a composite active material comprising an active material, a coat layer with an average thickness of less than 100 nm, formed on a surface of the active material and composed of an ion conductive oxide, and a carbon particle penetrating the coat layer, formed on a surface of the active material.

According to the present invention, the composite active material having favorable electron conductivity may be obtained by having carbon particles penetrating the coat layer. Also, according to the present invention, the average thickness of the coat layer is so thin as to allow the increase of resistance due to the coat layer to be controlled to the minimum.

In the invention, the average length of the carbon particle in the normal direction on a surface of the active material is preferably 150 nm or less. The reason therefor is that the carbon particles are retained so easily on a surface of the active material as to decrease a possibility of sliding down.

Also, the present invention provides a solid state battery comprising a cathode active material layer, an anode active material layer, and a solid electrolyte layer formed between the cathode active material layer and the anode active material layer, characterized in that at least one of the cathode active material layer and the anode active material layer contains the composite active material described above.

According to the present invention, the use of the above-mentioned composite active material allows the battery with low resistance.

Also, the present invention provides a producing method for a composite active material, comprising steps of: a supporting step of supporting a carbon particle on a surface of an active material to form a carbon particle-supporting active material, a precursor active material forming step of forming a precursor active material having a precursor layer on the surface of the active material composing the carbon particle-supporting active material by a fluidized bed coating method while using a coat layer forming solution, and a heat-treating step of heat-treating the precursor layer to form a coat layer with an average thickness of less than 100 nm, composed of an ion conductive oxide.

According to the present invention, the composite active material with high adhesion properties between the active material and the carbon particles may be obtained by supporting the carbon particles on a surface of the active material before forming a coat layer. In addition, the use of a fluidized bed coating method allows the precursor layer to be formed on a surface of the active material portion in the carbon particle-supporting active material, and simultaneously the precursor layer not to be formed on a surface of the carbon particle portion in the carbon particle-supporting active material. Thus, the composite active material provided with the carbon particles penetrating the coat layer may be efficiently obtained.

Also, the present invention provides a producing method for a composite active material, comprising steps of: a mixed solution forming step of forming a mixed solution containing a carbon particle irradiated with ultraviolet ray and a coat layer forming raw material, a precursor active material forming step of forming a precursor active material having a precursor layer and the carbon particle on a surface of the active material by a fluidized bed coating method while using the mixed solution, and a heat-treating step of heat-treating the precursor layer to form a coat layer with an average thickness of less than 100 nm, composed of an ion conductive oxide.

According to the present invention, the composite active material with high adhesion properties between the active material and the carbon particles may be obtained by using the carbon particles irradiated with ultraviolet rays. In addition, the use of a fluidized bed coating method allows the precursor layer to be formed on a surface of the active material, and simultaneously the precursor layer not to be formed on a surface of the carbon particles supported by the active material. Thus, the composite active material provided with the carbon particles penetrating the coat layer may be efficiently obtained.

In the invention, the specific surface area of the carbon particle is preferably 39 $m^2/g$ or more. The reason therefor is that the carbon particles with large specific surface area have so many irregularities on the surface as to be easily supported on a surface of the active material.

Advantageous Effects of Invention

A composite active material of the present invention produces the effect such as to have favorable electron conductivity.

DESCRIPTION OF EMBODIMENTS

A composite active material, a solid state battery and a producing method for a composite active material of the present invention are hereinafter described in detail.

A. Composite Active Material

The composite active material of the present invention comprises an active material, a coat layer with an average thickness of less than 100 nm, formed on a surface of the active material and composed of an ion conductive oxide, and carbon particles penetrating the coat layer, formed on a surface of the active material.

Figure 1A:
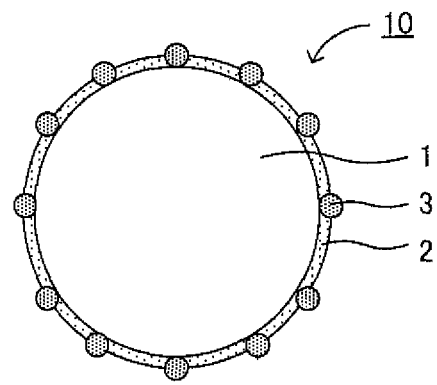
FIGS. 1A and 1B are each a schematic cross-sectional view showing an example of a composite active material of the present invention.
Figure 1B:
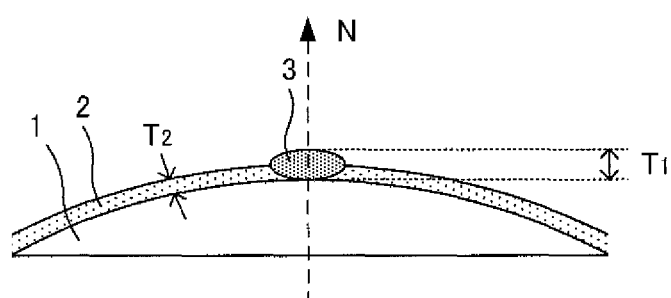

FIGS. 1A and 1B are each a schematic cross-sectional view showing an example of the composite active material of the present invention. A composite active material 10 in FIG. 1A comprises an active material 1, a coat layer 2 with an average thickness in a predetermined range, formed on a surface of the active material 1 and composed of an ion conductive oxide, and carbon particles 3 penetrating the coat layer 2, formed on a surface of the active material 1.

According to the present invention, the composite active material having favorable electron conductivity may be obtained by having carbon particles penetrating the coat layer. Also, according to the present invention, the average thickness of the coat layer is so thin as to allow the increase of resistance due to the coat layer to be controlled to the minimum. Specifically, in the case where ion conductivity of the coat layer is low, the great thinning of the average thickness thereof allows the increase of resistance resulting from low ion conductivity of the coat layer to be restrained. A mechanical coat method such as ball mill is known as a conventional method for forming the coat layer; however, it is difficult to obtain the coat layer with an average thickness of less than 100 nm, for example. On the contrary, in the present invention, the use of the after-mentioned fluidized bed coating method allows the coat layer with a very thin average thickness.

Also, in the present invention, the average thickness of the coat layer is so thin as to retain the carbon particles on a surface of the active material with difficulty. On the contrary, in the present invention, the use of the method as described later allows adhesion properties between the active material and the carbon particles to be improved. Thus, even in the case where the average thickness of the coat layer is very thin, the carbon particles may be retained with favorable adhesion properties on a surface of the active material. In addition, adhesion properties between the active material and the carbon particles are so high as to allow the composite active material having favorable electron conductivity.

The composite active material of the present invention is hereinafter described in each constitution.

1. Active Material

The kind of the active material in the present invention is not particularly limited but is preferably selected properly in accordance with the kind of a battery. Examples of the active material used for a lithium battery include lithium cobaltate ($LiCoO_2$), lithium nickelate ($LiNiO_2$), $LiNi_{1/3}Mn_{1/3}Co_{1/3}O_2$, lithium manganate ($LiMn_2O_4$), heterogeneous element substitution Li—Mn spinel represented by $Li_{1+x}Mn_{2-x-y}M_yO_4$ (x+y=2, M=at least one kind selected from Al, Mg, Co, Fe, Ni and Zn), lithium titanate (an oxide containing Li and Ti), lithium metal phosphate ($LiMPO_4$, M=at least one kind selected from Fe, Mn, Co and Ni), transition metal oxide (such as vanadium oxide ($V_2O_5$) and molybdenum oxide ($MoO_3$)), titanium sulfide ($TiS_2$), carbon material (such as graphite and hard carbon), lithium cobalt nitride (LiCoN), lithium silicon oxide (an oxide containing Li and Si), lithium metal (Li), lithium alloy (such as LiM; M=Sn, Si, Al, Ge, Sb and P), lithium storable intermetallic compound (such as storable intermetallic compound containing Mg and M; M=Sn, Ge and Sb, and storable intermetallic compound containing N and Sb; N=In, Cu and Mn), and derivatives thereof.

Also, the active material in the present invention is preferably an oxide active material. The reason therefor is to allow a high-capacity active material. Also, an oxide active material and a sulfide solid electrolyte material react so easily that both react to form a high resistive layer. On the contrary, the advantage that a reaction of both may be retrained is brought by providing a coat layer on the surface of the oxide active material.

The shape of the active material is not particularly limited but is preferably a particulate shape, for example. Examples of the shape of the particles include a spherical shape and an elliptic shape. Also, an average particle diameter of the active material is, for example, preferably within a range of 500 nm to 100 μm, and more preferably within a range of 1 μm to 20 μm.

2. Coat Layer

The coat layer in the present invention is a layer with an average thickness of less than 100 nm, formed on a surface of the active material and composed of an ion conductive oxide. A reaction between the active material and a solid electrolyte material may be restrained by providing the coat layer on the surface of the active material.

The coat layer is composed of an ion conductive oxide. The composition of the ion conductive oxide is not particularly limited but is, for example, preferably an oxide containing elements of the first or second family, and elements of the third to sixth families and the thirteenth to fifteenth families. Above all, an Li-containing oxide containing lithium as elements of the first family is more preferable. Also, the ion conductive oxide preferably contains an element of at least one kind of B, Si, Ti, Zr, V, P, Al, Nb, Ta, Cr, Mo and W as elements of the third to sixth families and the thirteenth to fifteenth families. Specific examples thereof include $LiNbO_3$, $Li_3BO_3$, $LiBO_2$, $Li_2CO_3$, $LiAlO_2$, $Li_4SiO_4$, $Li_2SiO_3$, $Li_3PO_4$, $Li_2SO_4$, $Li_2TiO_3$, $Li_4Ti_5O_{12}$, $Li_2Ti_2O_5$, $Li_2ZrO_3$, $Li_2MoO_4$ and $Li_2WO_4$; among them, $LiNbO_3$ is more preferable.

In addition, the ion conductive oxide may be a complex compound of the Li-containing oxides. An optional combination of the Li-containing oxides described above may be adopted as such a complex compound, and examples thereof include $Li_3PO_4$—$Li_4SiO_4$, $Li_3BO_3$—$Li_4SiO_4$ and $Li_3PO_4$—$Li_4GeO_4$. Also, other examples of the ion conductive oxide include amorphous oxides such as $Li_2O$—$B_2O_3$—$P_2O_5$, $Li_2O$—$SiO_2$, $Li_2O$—$B_2O_3$ and $Li_2O$—$B_2O_3$—$ZnO$, and crystalline oxides such as $LiI$—$Al_2O_3$, $Li_5La_3Ta_2O_{12}$, $Li_7La_3Zr_2O_{12}$ and $Li_6BaLa_2Ta_2O_{12}$.

The ion conductance (25° C.) of the ion conductive oxide is, for example, preferably $10^{-9}$ S/cm to $10^{-3}$ S/cm. Also, the electron conductance (25° C.) of the ion conductive oxide is, for example, preferably $10^{-8}$ S/cm to $10^{-1}$ S/cm.

The average thickness of the coat layer is ordinarily less than 100 nm. Above all, the average thickness is preferably 30 nm or less, and more preferably 15 nm or less. The reason therefor is that too large average thickness brings a possibility of not sufficiently being capable of restraining the increase of resistance due to the coat layer. On the other hand, the average thickness is, for example, preferably 1 nm or more, and more preferably 5 nm or more. The reason therefor is that too small average thickness brings a possibility of not sufficiently being capable of restraining a reaction between the active material and the solid electrolyte material. Incidentally, the average thickness may be measured from image analysis by a scanning electron microscope (SEM) or a transmission electron microscope (TEM). The number of samples is preferably 10 or more. Also, the average coverage factor of the coat layer for the active material is, for example, preferably 50% or more, and more preferably 80% or more. Also, the coat layer may cover the whole surface of the active material. Incidentally, the average coverage factor of the coat layer may be measured by using a transmission electron microscope (TEM) and an X-ray photoelectron spectroscopy (XPS), for example. The number of samples is preferably 10 or more.

3. Carbon Particles

The carbon particles in the present invention penetrate the coat layer, and are formed on a surface of the active material. One surface of the carbon particles contacts with the active material, and the other surface of the carbon particles penetrates the coat layer and is exposed, so that a favorable electron conduction path may be formed.

The kind of the carbon particles is not particularly limited but examples thereof include crystalline carbon (carbon such that all atom positions may be substantially prescribed), microcrystalline carbon and amorphous carbon; microcrystalline carbon or amorphous carbon is preferable. The reason therefor is to be so hard as compared with crystalline carbon as to easily form a constitution penetrating the coat layer. Examples of the carbon particles corresponding to microcrystalline carbon or amorphous carbon include carbon black, active carbon, hard carbon, soft carbon and mesoporous carbon; among them, carbon black is preferable. The reason therefor is to have a structure constitution and be easily supported on a surface of the active material. Incidentally, the structure constitution signifies a constitution in which the particles exist in a state of fusing with each other. Thus, the carbon particles in the present invention preferably have the structure constitution.

Also, carbon black may be roughly divided into two by a synthesis method therefor. Specifically, carbon black may be roughly divided into incomplete combustion carbon black and pyrolytic carbon black. Examples of incomplete combustion carbon black include furnace black (Ketjen Black) using petroleum as a raw material and channel black using natural gas as a raw material. On the other hand, examples of pyrolytic carbon black include acetylene black using acetylene as a raw material and thermal black using natural gas as a raw material. Above all, the carbon particles in the present invention are preferably acetylene black. The reason therefor is that the ratio of the carbon component is high and electron conductivity is high.

The specific surface area of the carbon particles is preferably large. The reason therefor is that the carbon particles with large specific surface area have so many irregularities on the surface as to be easily supported on a surface of the active material. In particular, on the occasion of treatment for forming the after-mentioned carbon particle-supporting active material, the carbon particles with large specific surface area have the advantage that an active plane appears so easily as to increase adhesion properties to the active material. Also, large specific surface area of the carbon particles brings the advantage that the effect of improving dispersibility by the after-mentioned ultraviolet-light irradiation is easily obtained. The specific surface area of the carbon particles is, for example, preferably 39 $m^2$/g or more, and more preferably 200 $m^2$/g or more.

The shape of the carbon particles is not particularly limited but examples thereof include a spherical shape and an elliptic shape. An average particle diameter of the carbon particles is, for example, preferably within a range of 1 nm to 150 nm, and more preferably within a range of 1 nm to 50 nm. Incidentally, the average particle diameter may be measured from image analysis by a scanning electron microscope (SEM) or a transmission electron microscope (TEM). The number of samples is preferably 100 or more.

Here, as shown in FIG. 1B, the average length of the carbon particles 3 in the normal direction N on a surface of the active material 1 is regarded as $T_1$, and the average thickness of the coat layer 2 is regarded as $T_2$. The value of $T_1$ is not particularly limited but is, for example, preferably 150 nm or less, and more preferably 50 nm or less. The reason therefor is that too large value of $T_1$ causes the carbon particles to be retained with such difficulty on a surface of the active material as to increase a possibility of sliding down. On the other hand, the value of $T_1$ is, for example, preferably 1 nm or more. Incidentally, the value of $T_1$ may be measured by the same method as the average particle diameter of the carbon particles described above. Also, the value of $T_2$ is ordinarily less than 100 nm as described above. The value of $T_2/T_1$ is not particularly limited but is, for example, 10% or more, preferably 50% or more, and more preferably 80% or more. The reason therefor is to allow sliding down of the carbon particles to be sufficiently restrained.

The ratio of the carbon particles to the active material varies greatly with the size of the carbon particles, but the carbon particles are preferably within a range of 0.1 part by weight to 5 parts by weight, and more preferably within a range of 0.3 part by weight to 1 part by weight with respect to 100 parts by weight of the active material.

4. Composite Active Material

The composite active material of the present invention is ordinarily used for a battery, preferably used for a solid state battery above all. Also, a producing method for the composite active material of the present invention is described in 'C. Producing method for composite active material'; therefore, the description herein is omitted.

B. Solid State Battery

Next, a solid state battery of the present invention is described. The solid state battery of the present invention comprises a cathode active material layer, an anode active material layer, and a solid electrolyte layer formed between the cathode active material layer and the anode active material layer, characterized in that at least one of the cathode active material layer and the anode active material layer contains the composite active material described above.

Figure 2:
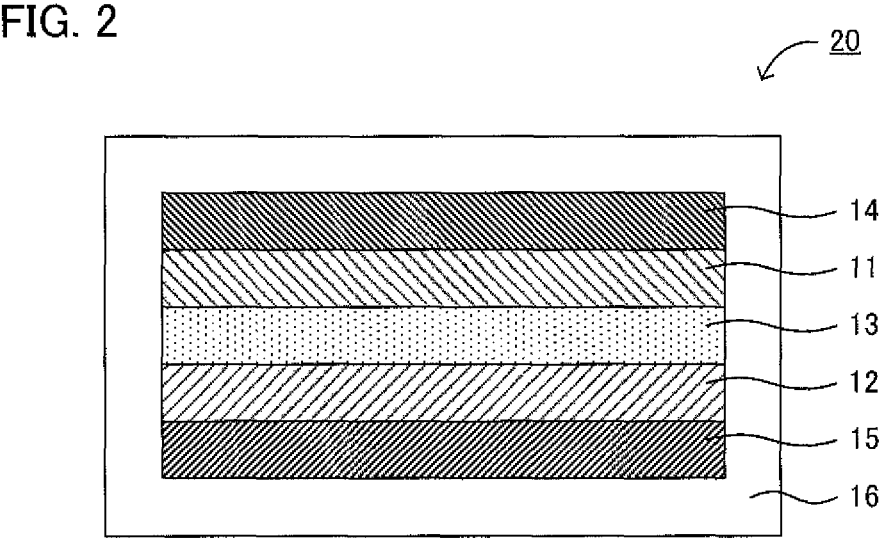
FIG. 2 is a schematic cross-sectional view showing an example of a solid state battery of the present invention.

FIG. 2 is a schematic cross-sectional view showing an example of the solid state battery of the present invention. As shown in FIG. 2, a solid state battery 20 of the present invention comprises a cathode active material layer 11 containing a cathode active material, an anode active material layer 12 containing an anode active material, a solid electrolyte layer 13 formed between the cathode active material layer 11 and the anode active material layer 12, a cathode current collector 14 for performing current collecting of the cathode active material layer 11, an anode current collector 15 for performing current collecting of the anode active material layer 12, and a battery case 16 for storing these members. The present invention is greatly characterized in that at least one of the cathode active material layer 11 and the anode active material layer 12 contains the composite active material described in 'A. Composite active material'.

According to the present invention, the use of the above-mentioned composite active material allows the battery with low resistance.

The solid state battery of the present invention is hereinafter described in each constitution.

1. Cathode Active Material Layer

The cathode active material layer in the present invention is a layer containing at least a cathode active material, and may contain at least one of a solid electrolyte material, a conductive material and a binder, as required. Above all, in the present invention, the cathode active material layer preferably contains the composite active material described above.

Also, in the present invention, the cathode active material layer preferably contains a solid electrolyte material, more preferably a sulfide solid electrolyte material. The reason therefor is to allow the cathode active material layer with high ion conductivity. Also, for example, the use of an oxide active material and a sulfide solid electrolyte material by combination causes both of them to react to form a high resistive layer on an interface therebetween. On the contrary, the composite active material described above has the coat layer to thereby have the advantage that the reaction of both may be restrained. Incidentally, the same material as the solid electrolyte material used for the after-mentioned solid electrolyte layer may be used for the solid electrolyte material used for the cathode active material layer. The content of the cathode active material in the cathode active material layer is, for example, preferably 10% by weight or more, and more preferably within a range of 20% by weight to 90% by weight.

The cathode active material layer may further contain a conductive material. The addition of the conductive material allows electron conductivity of the cathode active material layer to be improved. Examples of the conductive material include acetylene black, Ketjen Black and carbon fiber. Also, the cathode active material layer may contain a binder. Examples of kinds of the binder include a fluorine-containing binder such as polytetrafluoroethylene (PTFE). Also, the thickness of the cathode active material layer is preferably within a range of 0.1 μm to 1000 μm, for example.

2. Anode Active Material Layer

The anode active material layer in the present invention is a layer containing at least an anode active material, and may contain at least one of a solid electrolyte material, a conductive material and a binder, as required. Above all, in the present invention, the anode active material layer preferably contains the composite active material described above.

Also, in the present invention, the anode active material layer preferably contains a solid electrolyte material, and more preferably a sulfide solid electrolyte material. The reason therefor is to allow the anode active material layer with high ion conductivity. Incidentally, the same material as the solid electrolyte material used for the after-mentioned solid electrolyte layer may be used for the solid electrolyte material used for the anode active material layer. Also, in the case where the cathode active material layer contains the composite active material described above, the anode active material layer may contain a general anode active material. Examples of the general anode active material include a metal active material and a carbon active material. Examples of the metal active material include In, Al, Si, and Sn. On the other hand, examples of the carbon active material include mesocarbon microbeads (MCMB), high orientation property graphite (HOPG), hard carbon and soft carbon. The content of the anode active material in the anode active material layer is, for example, preferably 10% by weight or more, and more preferably within a range of 20% by weight to 90% by weight.

Incidentally, a conductive material and a binder used for the anode active material layer are the same as the case of the above-mentioned cathode active material layer. The thickness of the anode active material layer is preferably within a range of 0.1 μm to 1000 μm, for example.

3. Solid Electrolyte Layer

The solid electrolyte layer in the present invention is a layer formed between the cathode active material layer and the anode active material layer. The solid electrolyte layer contains at least a solid electrolyte material. Examples of the solid electrolyte material include a sulfide solid electrolyte material and an oxide solid electrolyte material. Examples of the sulfide solid electrolyte material having Li ion conductivity include $Li_2S-P_2S_5$, $Li_2S-P_2S_5-LiI$, $Li_2S-P_2S_5-Li_2O$, $Li_2S-P_2S_5-Li_2O-LiI$, $Li_2S-SiS_2$, $Li_2S-SiS_2-LiI$, $Li_2S-SiS_2-LiBr$, $Li_2S-SiS_2-LiCl$, $Li_2S-SiS_2-B_2S_3-LiI$, $Li_2S-SiS_2-P_2S_5-LiI$, $Li_2S-B_2S_3$, $Li_2S-P_2S_5-Z_mS_n$ (in which "m" and "n" are positive numbers, Z is any one of Ge, Zn and Ga), $Li_2S-GeS_2$, $Li_2S-SiS_2-Li_3PO_4$, and $Li_2S-SiS_2-Li_xMO_y$ (in which "x" and "y" are positive numbers, M is any one of P, Si, Ge, B, Al, Ga and In). Incidentally, the description of the above-mentioned "$Li_2S-P_2S_5$" signifies the sulfide solid electrolyte material obtained by using a raw material composition containing $Li_2S$ and $P_2S_5$, and other descriptions signify similarly.

On the other hand, examples of the oxide solid electrolyte material having Li ion conductivity include a compound having a NASICON type structure. Examples of the compound having a NASICON type structure include a compound (LAGP) represented by a general formula $Li_{1+x}Al_xGe_{2-x}(PO_4)_3$ ($0 \le x \le 2$) and a compound (LATP) represented by a general formula $Li_{1+x}Al_xTi_{2-x}(PO_4)_3$ ($0 \le x \le 2$). Also, other examples of the oxide solid electrolyte material include LiLaTiO (such as $Li_{0.34}La_{0.51}TiO_3$), LiPON (such as $Li_{2.9}PO_{3.3}N_{0.46}$) and LiLaZrO (such as $Li_7La_3Zr_2O_{12}$).

The content of the solid electrolyte material in the solid electrolyte layer is, for example, preferably 60% by weight or more, more preferably 70% by weight or more, and far more preferably 80% by weight or more. The solid electrolyte layer may contain a binder or consist of only the solid electrolyte material. The thickness of a solid electrolyte layer is preferably within a range of 0.1 μm to 1000 μm, for example, and within a range of 0.1 μm to 300 μm, above all.

4. Other Constitutions

The solid state battery of the present invention comprises at least the cathode active material layer, the anode active material layer and the solid electrolyte layer, ordinarily further comprising a cathode current collector for collecting the cathode active material layer and an anode current collector for collecting the anode active material layer. Examples of a material for the cathode current collector include SUS, aluminum, nickel, iron, titanium and carbon. On the other hand, examples of a material for the anode current collector include SUS, copper, nickel and carbon. The thickness and shape of the cathode current collector and the anode current collector are preferably selected properly in accordance with factors such as uses of the battery. Also, a battery case of a general battery may be used for a battery case. Examples of the battery case include a battery case made of SUS.

5. Solid State Battery

Examples of the solid state battery of the present invention include a lithium battery, a sodium battery, a magnesium battery and a calcium battery; above all, preferably a lithium battery. In addition, the solid state battery of the present invention may be a primary battery or a secondary battery, and preferably a secondary battery among them. The reason therefor is to be repeatedly charged and discharged and be useful as a car-mounted battery, for example. Examples of the shape of the battery include a coin shape, a laminate shape, a cylindrical shape and a rectangular shape.

C. Producing Method for Composite Active Material

Next, a producing method for a composite active material of the present invention is described. The producing method for a composite active material of the present invention may be roughly divided into two embodiments. The producing method for a composite active material of the present invention is hereinafter described while divided into a first embodiment and a second embodiment.

1. First Embodiment

The producing method for a composite active material of the first embodiment comprises steps of: a supporting step of supporting carbon particles on a surface of an active material to form a carbon particle-supporting active material, a precursor active material forming step of forming a precursor active material having a precursor layer on a surface of the active material composing the carbon particle-supporting active material by a fluidized bed coating method while using a coat layer forming solution, and a heat-treating step of heat-treating the precursor layer to form a coat layer with an average thickness of less than 100 nm, composed of an ion conductive oxide.

Figure 3:
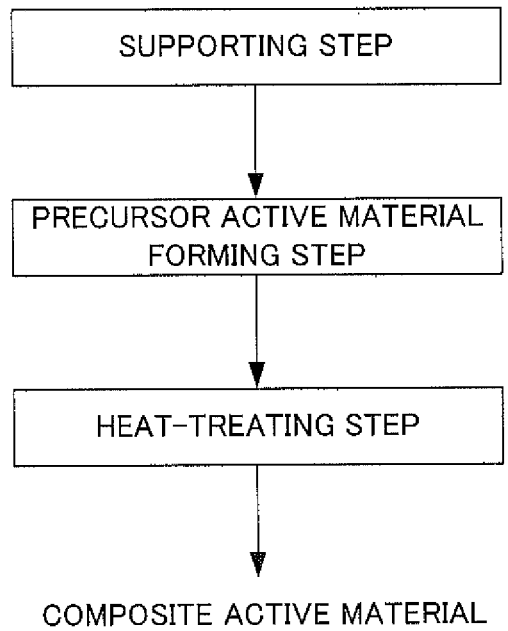
FIG. 3 is a flow chart exemplifying a producing method for a composite active material of the present invention.

FIG. 3 is a flow chart exemplifying the producing method for a composite active material of the first embodiment. In FIG. 3, carbon particles are supported on a surface of an active material to form a carbon particle-supporting active material (supporting step). Next, a precursor active material having a precursor layer is formed on a surface of the carbon particle-supporting active material in the active material portion (on a surface of a portion which is not carbon particles) by a fluidized bed coating method while using a coat layer forming solution (precursor active material forming step). Lastly, the precursor layer is heat-treated to form a desired coat layer (heat-treating step). Thus, a composite active material is obtained.

According to the first embodiment, the composite active material with high adhesion properties between the active material and the carbon particles may be obtained by supporting the carbon particles on a surface of the active material before forming a coat layer. In addition, the use of a fluidized bed coating method allows the precursor layer to be formed on a surface of the active material portion in the carbon particle-supporting active material, and simultaneously the precursor layer not to be formed on a surface of the carbon particle portion in the carbon particle-supporting active material. Thus, the composite active material provided with the carbon particles penetrating the coat layer may be efficiently obtained.

The reason why the precursor layer may be selectively formed on a surface of the active material portion in the carbon particle-supporting active material is as follows. That is to say, in a fluidized bed coating method, the particles contact with each other or with a rotor and an inwall of the apparatus, so as to cause a phenomenon such that they rub against each other. Thus, even though the precursor layer begins to be formed on a surface of the carbon particles disposed projectingly on a surface of the active material, the precursor layer is preferentially removed by the phenomenon of rubbing. As a result, the precursor layer may be selectively formed on a surface of the active material portion. In addition, in a fluidized bed coating method, a coat layer forming solution is dried by the phenomenon of rubbing in a state of being thinly stretched out. Thus, the precursor layer may be formed without producing a granulated body (a secondary granule including plural particles). On the other hand, for example, the use of a dip-dry method and a spray-drier method brings a possibility of forming the granulated body and being incapable of forming the carbon particles penetrating the coat layer.

The producing method for a composite active material of the first embodiment is hereinafter described in each step.

(1) Supporting Step

The Supporting step in the first embodiment is a step of supporting carbon particles on a surface of an active material to form a carbon particle-supporting active material. The adhesion properties between the active material and the carbon particles may become high by supporting the carbon particles on a surface of the active material before forming a coat layer.

A supporting method for supporting the carbon particles on a surface of the active material is preferably a method for supporting so as to allow high adhesion properties to the active material. Specifically, the method is preferably a method for applying mechanical force to composite the active material and the carbon particles in a solid phase. Examples of the supporting method include a method using a dispersion shredder with the use of media, typified by ball mill and bead mill, a method using a rotary and revolutionary mixer with no use of media, and a method using a surface reformer such as Nobilta NOB™ (manufactured by Hosokawa Micron Corporation) and hybridization system (manufactured by Nara Machinery Co., Ltd). Various kinds of conditions in the supporting method are preferably adjusted so as to allow a desired carbon particle-supporting active material.

(2) Precursor Active Material Forming Step

The precursor active material forming step in the first embodiment is a step of forming a precursor active material having a precursor layer on a surface of the active material composing the carbon particle-supporting active material by a fluidized bed coating method while using a coat layer forming solution.

The coat layer forming solution contains a coat layer forming raw material and a solvent. The coat layer forming raw material is not particularly limited if the material is such as to allow the coat layer (the ion conductive oxide) described above. Above all, the coat layer forming raw material preferably contains at least an alkoxide compound. The reason therefor is that the utilization of a sol-gel reaction allows a desired coat layer easily.

In the case where the ion conductive oxide is represented by a general formula $Li_xAO_y$, the coat layer forming raw material contains Li-containing compound and A-containing compound. Examples of the Li-containing compound include Li alkoxide such as ethoxylithium and methoxylithium, lithium acetate, and lithium hydroxide. Examples of the A-containing compound include alkoxide containing A, acetate containing A, and hydroxide containing A. In the case where specific examples of A include niobium (Nb), examples of the Nb-containing compound include Nb alkoxide such as pentaethoxyniobium, pentamethoxyniobium, penta-i-propoxyniobium, penta-n-propoxyniobium, penta-i-butoxyniobium, penta-n-butoxyniobium and penta-sec-butoxyniobium, niobium acetate, and niobium hydroxide.

Examples of the solvent used for the coat layer forming solution include a polar solvent having a polar functional group such as a hydroxyl group; specifically, alcohol is preferable. In addition, examples of the alcohol include ethanol, methanol, propanol, and butanol. The moisture amount contained in the solvent is, for example, preferably 0.005% by weight or less, more preferably 0.0025% by weight or less, and far more preferably 0.00025% by weight or less.

Also, in the first embodiment, a fluidized bed coating method is ordinarily used. The fluidized bed coating method is a technique of film coating with the use of a fluidized bed granulating/coating apparatus, which may perform uniform coating by repeating atomizing/drying of the liquid on a particle. Examples of such an apparatus include a multiplex manufactured by POWREX Corporation, Ltd. and a flow coater manufactured by Freund Corporation. Also, in the fluidized bed coating method, on the occasion of performing atomizing/drying of the coat layer forming solution, in order to make the active material into a fluid state, an air current is caused in a vessel and a rotor is rotated as required. The conditions of the air current and the rotating conditions of the rotor may be properly determined and are not particularly limited. Also, from the viewpoint of efficiently drying the coat layer forming solution, the air current temperature (gas current temperature) in the vessel is preferably 80° C. or more.

(3) Heat-Treating Step

The heat-treating step in the first embodiment is a step of heat-treating the precursor layer to form a coat layer with an average thickness of less than 100 nm, composed of an ion conductive oxide.

The heat-treating temperature in the present step is not particularly limited if the heat-treating temperature is a temperature such as to allow an intended coat layer to be formed, but is, for example, preferably within a range of 300° C. to 500° C., more preferably within a range of 350° C. to 450° C., and particularly preferably within a range of 350° C. to 400° C. The reason therefor is that too low heat-treating temperature brings a possibility that sufficient heat treatment may not be performed and an intended coat layer is not obtained, while too high heat-treating temperature brings a possibility of causing the deterioration of the active material.

The atmosphere in performing heat treatment is not particularly limited, but the atmosphere is preferably an atmosphere including oxygen so as to promote oxidation. Specifically, heat treatment is preferably performed in an atmosphere of the air. The heat-treating time is not particularly limited but is, for example, 0.5 hour or more, preferably within a range of 0.5 hour to 48 hours, and more preferably within a range of 1 hour to 20 hours. Examples of a heating method include a method using a burning furnace. Examples of the burning furnace include a muffle furnace.

(4) Composite Active Material

The composite active material obtained by the producing method of the first embodiment is the same as the contents described in 'A. Composite active material'. Above all, in the producing method of the first embodiment, the carbon particles are supported on a surface of the active material before forming a coat layer, so that a component of the coat layer is not detected between the active material and the carbon particles. Thus, the advantage that electron conductivity is more favorable is brought.

2. Second Embodiment

The producing method for a composite active material of the second embodiment comprises steps of: a mixed solution forming step of forming a mixed solution containing carbon particles irradiated with ultraviolet rays and a coat layer forming raw material, a precursor active material forming step of forming a precursor active material having a precursor layer and the carbon particles on a surface of the active material by a fluidized bed coating method while using the mixed solution, and a heat-treating step of heat-treating the precursor layer to form a coat layer with an average thickness of less than 100 nm, composed of an ion conductive oxide.

Figure 4:
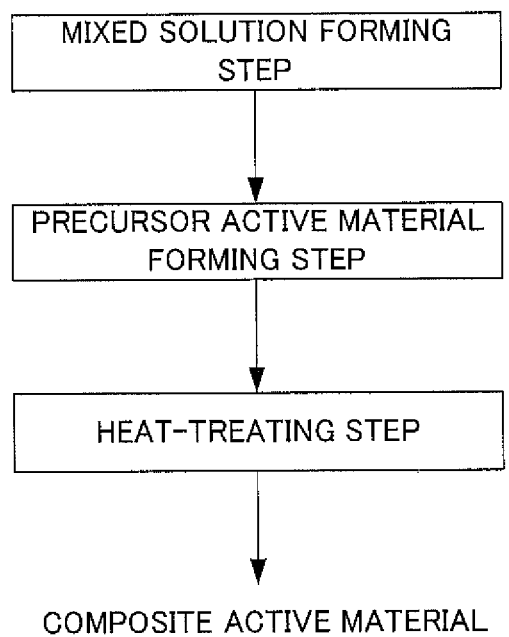
FIG. 4 is a flow chart exemplifying a producing method for a composite active material of the present invention.

FIG. 4 is a flow chart exemplifying the producing method for a composite active material of the second embodiment. In FIG. 4, a mixed solution containing carbon particles irradiated with ultraviolet rays and a coat layer forming raw material is formed (mixed solution forming step). Next, a precursor active material having a precursor layer and the carbon particles is formed on a surface of the active material by a fluidized bed coating method while using the mixed solution (precursor active material forming step). Lastly, the precursor layer is heat-treated to form a desired coat layer (heat-treating step). Thus, a composite active material is obtained.

According to the second embodiment, the composite active material with high adhesion properties between the active material and the carbon particles may be obtained by using the carbon particles irradiated with ultraviolet rays. In addition, the use of a fluidized bed coating method allows the precursor layer to be formed on a surface of the active material, and simultaneously the precursor layer not to be formed on a surface of the carbon particles supported by the active material. Thus, the composite active material provided with the carbon particles penetrating the coat layer may be efficiently obtained. The reason why the precursor layer may be selectively formed on a surface of the active material is as described above.

Also, in a fluidized bed coating method, the mixed solution is atomized little by little, and the atomizing mist is made to collide directly with the active material, which is immediately dried. In the second embodiment, the use of the carbon particles irradiated with ultraviolet rays allows the carbon particles to be dispersed with favorable wettability on a surface of the active material. In addition, in a fluidized bed coating method, atomizing and drying of the mist are repeated, so that the advantage that the carbon particles are easily fixed on a surface of the active material is brought. On the other hand, for example, a spray-drier method is not a system of repeating atomizing and drying of the mist, so that a possibility that the carbon particles are not fixed on a surface of the active material is brought.

The producing method for a composite active material of the second embodiment is hereinafter described in each step.

(1) Mixed Solution Forming Step

The mixed solution forming step in the second embodiment is a step of forming a mixed solution containing carbon particles irradiated with ultraviolet rays and a coat layer forming raw material.

The carbon particles irradiated with ultraviolet rays are ordinarily hydrophilized as compared with a state before being irradiated with ultraviolet rays. In the second embodiment, the carbon particles irradiated with ultraviolet rays may be used, or the carbon particles may be irradiated with ultraviolet rays and hydrophilized. In the case of irradiating the carbon particles with ultraviolet rays, one-time ultraviolet-light irradiation may be performed or ultraviolet-light irradiation may be performed by plural times; the latter is preferable. The reason therefor is that there is a possibility that sufficient hydrophilization may not be intended contrarily even though desired hydrophilization is intended by one-time ultraviolet-light irradiation. Thus, a possibility that the carbon particles are heated to deteriorate stability of a hydroxyl group existing on the surface is conceived when the time of ultraviolet-light irradiation is prolonged. The intensity of ultraviolet-light irradiation per one time is, for example, preferably within a range of 10 mW/cm$^2$ to 300 mW/cm$^2$, and more preferably within a range of 30 mW/cm$^2$ to 150 mW/cm$^2$. The time of ultraviolet-light irradiation per one time is, for example, preferably within 60 minutes, and more preferably within 5 minutes. Also, a UV lamp, an excimer UV lamp and the like may be used for a light source of ultraviolet-light irradiation.

The mixed solution in the second embodiment may decrease the added amount of a dispersant material for dispersing the carbon particles by reason of having the carbon particles irradiated with ultraviolet rays. In particular, it is preferable that the mixed solution does not have a dispersant material for dispersing the carbon particles. The reason therefor is that a dispersant material has a bad influence on the formation of a coat layer. It is conceived that a polymer is used as a dispersant material for dispersing the carbon particles; such a polymer inhibits a forming reaction of a coat layer (such as a sol-gel reaction) to form a coat layer with low ion conductance. On the other hand, the carbon particles are not dispersed into a polar solvent (a hydrophilic solvent) such as alcohol by reason of ordinarily having hydrophobic property. Thus, a dispersant material needs to be used for dispersing the carbon particles. On the contrary, in the second embodiment, the use of the carbon particles hydrophilized by irradiating with ultraviolet rays brings the advantage that the carbon particles may be dispersed into the solvent without using a dispersant material.

A method for preparing the mixed solution in the second embodiment is not particularly limited, but the mixed solution is preferably prepared by mixing a first solution containing the carbon particles irradiated with ultraviolet rays and a second solution containing the coat layer forming raw material. For example, the reason therefor is that the mixing with the second solution in a state of sufficiently increasing dispersibility of the carbon particles contained in the first solution allows reaction control of the second solution to be performed while highly maintaining dispersibility of the carbon particles. Also, in the second embodiment, ultrasonic dispersion treatment may be performed for the first solution or for the mixed solution.

(2) Precursor Active Material Forming Step

The precursor active material forming step in the second embodiment is the same as the precursor active material forming step in the first embodiment except for replacing the coat layer forming solution with the mixed solution; therefore, the description herein is omitted.

(3) Heat-Treating Step

The heat-treating step in the second embodiment is the same as the heat-treating step in the first embodiment; therefore, the description herein is omitted.

(4) Composite Active Material

The composite active material obtained by the producing method of the second embodiment is the same as the contents described in 'A. Composite active material'. Above all, in the producing method of the second embodiment, a composite compound may be produced without applying mechanical strong force to a surface of the active material, so that there is the advantage that a dynamically weak active material may be used.

Incidentally, the present invention is not limited to the above-mentioned embodiments. The above-mentioned embodiments are exemplification, and any is included in the technical scope of the present invention if it has substantially the same constitution as the technical idea described in the claim of the present invention and offers similar operation and effect thereto.

EXAMPLES

The present invention is described more specifically while showing examples and comparative examples hereinafter.

Example 1

(Production of Carbon Particle-Supporting Active Material)

A cathode active material ($LiNi_{1/3}Co_{1/3}Mn_{1/3}O_2$, manufactured by Nichia Corporation) and carbon particles (acetylene black, an average particle diameter of 48 nm, a specific surface area of 39 $m^2/g$, HS-100™, manufactured by Denki Kagaku Kogyo K.K.) were prepared. Next, the cathode active material was projected by 92 g into a surface reformer (NOB-MINI™, manufactured by Hosokawa Micron Corporation) to further project the carbon particles by 0.92 g (1% by weight with respect to the cathode active material) thereinto. Thereafter, composite treatment was performed on the conditions of 2900 rpm and 30 minutes to obtain a carbon particle-supporting active material. This operation was repeated plural times.

(Production of Coat Layer Forming Solution)

Added and mixed was 10.83 g of ethoxylithium (manufactured by Kojundo Chemical Lab. Co., Ltd.) to 500 g of dehydrated ethanol (manufactured by Wako Pure Chemical Industries, Ltd.). Thereafter, pentaethoxyniobium (manufactured by Kojundo Chemical Lab. Co., Ltd.) was added by 66.27 g thereto and mixed so that lithium and niobium were 1:1 at molar ratio. Thus, a coat layer forming solution was obtained.

(Production of Composite Active Material)

Fluidized was 505 g of the carbon particle-supporting active material (corresponding to 500 g of the cathode active material) in a coating apparatus (multiplex MP-01 Mini™, manufactured by Powrex Corp.) to supply the coat layer forming solution in that state. Thus, a precursor layer was formed on a surface of the active material composing the carbon particle-supporting active material. The operating conditions of the coating apparatus were intake gas: nitrogen gas, intake gas temperature: 80° C., intake gas volume: 0.3 $m^3/h$, number of rotor revolutions: 400 rpm, spray velocity: 1.5 g/min. Thereafter, burning was performed under an air atmosphere on the conditions of 350° C. for 5 hours. Thus, a composite active material was obtained.

(Production of Sulfide Solid Electrolyte Material)

$Li_2S$ (manufactured by NIPPON CHEMICAL INDUSTRIAL CO., LTD.) and $P_2S_5$ (manufactured by Sigma-Aldrich Co., LLC.) were used as a starting material. Next, $Li_2S$ and $P_2S_5$ were weighed in a glove box under an Ar atmosphere so as to be a molar ratio of $75Li_2S \cdot 25P_2S_5$ ($Li_3PS_4$, ortho-composition), and mixed with an agate mortar for 5 minutes to obtain 2 g of a raw material composition ($Li_2S$=0.7656 g, $P_2S_5$=1.2344 g). Projected was 2 g of this raw material composition into a vessel of planetary ball mill (45 cc, made of $ZrO_2$), dehydrated heptane (a moisture amount of 30 ppm or less, 4 g) was projected thereinto, and a $ZrO_2$ ball ($\varphi$=5 mm, 53 g) was projected thereinto to hermetically seal the vessel completely (Ar atmosphere). This vessel was mounted on a planetary ball mill machine (P7™ manufactured by FRITSCH JAPAN CO, LTD.) to perform mechanical milling at the number of soleplate revolutions of 370 rpm for 40 hours. Thereafter, the obtained test sample was dried in a vacuum to obtain a glassy sulfide solid electrolyte material.

(Production of Evaluation Battery)

The composite active material and the sulfide solid electrolyte material were mixed so as to be composite active material:sulfide solid electrolyte material=6:4 (volume ratio). In addition, a conductive material (VGCF, manufactured by Showa Denko K.K.) was added thereto so as to be 3% by weight with respect to the composite active material. The obtained mixture was projected into heptane to obtain cathode slurry. Next, the cathode slurry was dispersed by a supersonic homogenizer, coated on an aluminum foil, dried at a temperature of 100° C. for 30 minutes, and die-cut into 1 $cm^2$. Thus, a cathode was obtained.

Next, an anode active material (laminar carbon) and the sulfide solid electrolyte material were mixed so as to be anode active material:sulfide solid electrolyte material=5:5 (volume ratio). The obtained mixture was projected into heptane to obtain anode slurry. Next, the anode slurry was dispersed by a supersonic homogenizer, coated on a copper foil, dried at a temperature of 100° C. for 30 minutes, and die-cut into 1 $cm^2$. Thus, an anode was obtained.

Next, 64.8 mg of the sulfide solid electrolyte material was added to a cylindrical ceramic with an inside cross-sectional area of 1 $cm^2$, and pressed at a pressure of 1 ton to obtain a solid electrolyte layer. The cathode and the anode were disposed on both faces thereof and pressed at a pressure of 4.3 tons for 1 minute. The obtained power generating element was bound by a stainless stick at a pressure of 1 ton and regarded as an evaluation battery.

Example 2

An evaluation battery was obtained in the same manner as Example 1 except for replacing acetylene black with Ketjen Black (an average particle diameter of 40 nm, a specific surface area of 800 $m^2/g$, EC300J™, manufactured by Lion Corporation).

Comparative Example 1

An evaluation battery was obtained in the same manner as Example 1 except for replacing 505 g of the carbon particle-supporting active material with 500 g of the cathode active material ($LiNi_{1/3}Co_{1/3}Mn_{1/3}O_2$).

Comparative Example 2

An evaluation battery was obtained in the same manner as Example 1 except for forming a precursor layer by dipping and drying without using a coating apparatus.

Comparative Example 3

The production of the carbon particle-supporting active material was performed in the same manner as Example 1 except for replacing acetylene black with vapor grown carbon fiber (VGCF, a specific surface area of 13 $m^2/g$). However, VGCF was not supported on the active material and the carbon particle-supporting active material was not obtained. The reason therefor is guessed to be that it is difficult due to the shape thereof to strongly stick carbon fiber to the active material.

Comparative Example 4

The production of the carbon particle-supporting active material was performed in the same manner as Example 1 except for replacing acetylene black with carbon nanotube (CNT, a specific surface area of 498 m²/g). In this case, CNT was supported on the active material and the carbon particle-supporting active material was obtained. In addition, the production of the composite active material was performed in the same manner as Example 1 by using the obtained carbon particle-supporting active material. However, a structure in which CNT penetrated the coat layer was not obtained. The reason therefor is guessed to be that the aspect ratio is so high that CNT may not be oriented so as to penetrate the coat layer.

parative Example 3 were prepared. These carbon materials were irradiated with ultraviolet rays on the conditions of the following Table 1. Incidentally, an excimer UV lamp was used for a light source and the intensity of ultraviolet-light irradiation per one time was determined at 140 mW/cm². Thereafter, 0.1 g of the carbon materials were added to 10 cc of ethanol to evaluate dispersibility from the presence or absence of precipitation. A state of producing no precipitation was regarded as ◯ and a state of producing precipitation was regarded as ×.

TABLE 1

| specific surface area [m²/g] UV treating time × number of times | | acetylene black 39 | | | | VGCF 13 | |
|---|---|---|---|---|---|---|---|
| | | untreated | 5 min × 1 | 30 min × 1 | 5 min × 6 | untreated | 5 min × 6 |
| dispersibility | 0 min | ◯ | ◯ | ◯ | ◯ | × | × |
| | 10 min | ◯ | ◯ | ◯ | ◯ | × | × |
| | 20 min | ◯ | ◯ | ◯ | ◯ | × | × |
| | 30 min | × | ◯ | ◯ | ◯ | × | × |
| | 1 hr | × | × | ◯ | ◯ | × | × |
| | 3 hr | × | × | × | ◯ | × | × |

Evaluations 1

(Cross-Sectional Observation)

Figure 5:
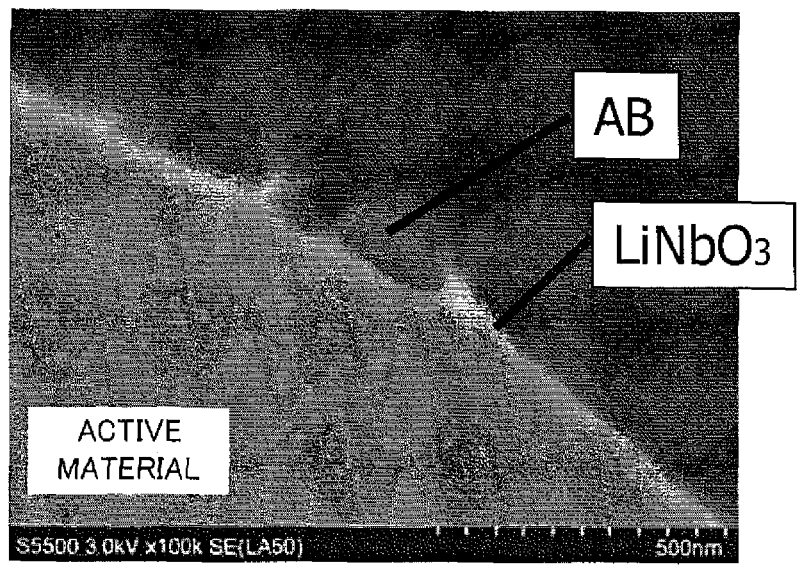
FIG. 5 is a result of cross-sectional observation of a composite active material produced in Example 1.

The cross section of the composite active material produced in Example 1 was observed by a scanning electron microscope (SEM). Specifically, the composite active material was embedded in resin to perform SEM observation for the sample processed by a cross section polisher. The result is shown in FIG. 5. As shown in FIG. 5, a coat layer and carbon particles penetrating the coat layer were formed on a surface of the active material. The average thickness of the coat layer was 7 nm and the average coverage factor of the coat layer was 91%. In addition, the average length of the carbon particles in the normal direction on a surface of the active material was 62 nm.

Figure 6:
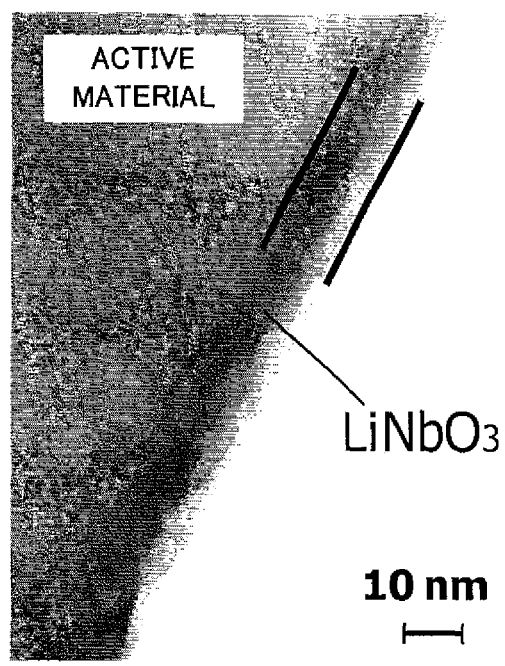
FIG. 6 is a result of cross-sectional observation of a composite active material produced in Comparative Example 1.
Figure 7:
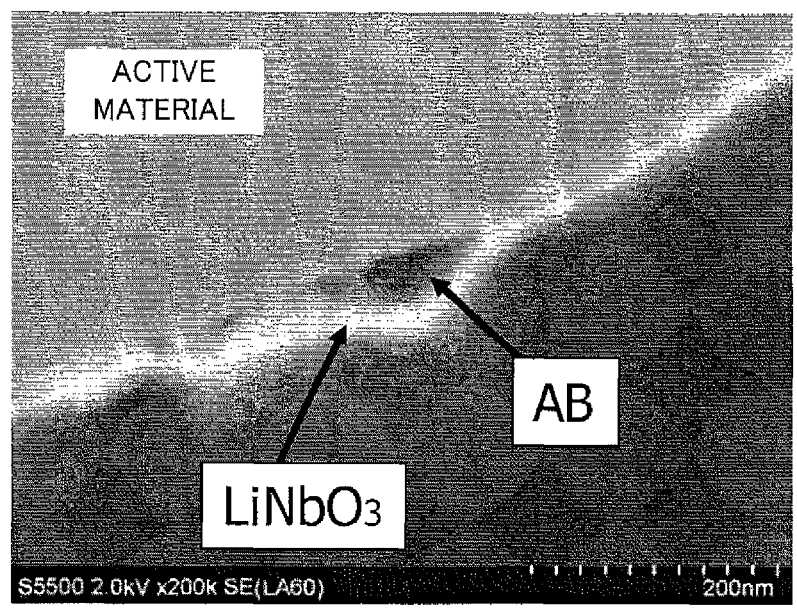
FIG. 7 is a result of cross-sectional observation of a composite active material produced in Comparative Example 2.

Also, the cross section of the composite active material produced in Comparative Example 1 was observed by a transmission electron microscope (TEM). Specifically, TEM observation was performed for the sample processed by a focused ion beam method (FIB method). The result is shown in FIG. 6. As shown in FIG. 6, in Comparative Example 1, the coat layer was formed in the same manner as Example 1. Also, the cross section of the composite active material produced in Comparative Example 2 was observed by SEM. The result is shown in FIG. 7. As shown in FIG. 7, in Comparative Example 2, the coat layer was formed on a surface of the carbon particles, which did not penetrate the coat layer.

(Resistance Measurement)

Figure 8:
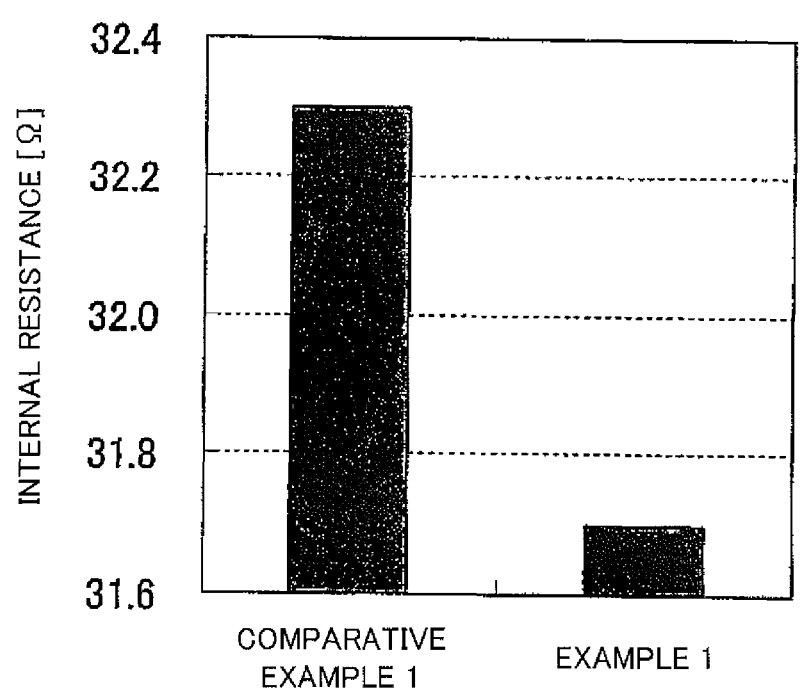
FIG. 8 is a result of resistance measurement of an evaluation battery each obtained in Example 1 and Comparative Example 1.

The internal resistance of the evaluation battery obtained in Example 1 and Comparative Example 1 was measured. Specifically, the evaluation battery was charged up to a voltage of 4.55 V and subsequently discharged up to a voltage of 2.5 V to thereafter measure internal resistance at a voltage of 3.6 V. The result is shown in FIG. 8. As shown in FIG. 8, it may be confirmed that Example 1 was lower in internal resistance than Comparative Example 1.

Reference Example 1

(Dispersibility Evaluation of Carbon Material)

The carbon particles (acetylene black) used in Example 1 and the vapor grown carbon fiber (VGCF) used in Com- As shown in Table 1, it was confirmed that the carbon particles were hydrophilized by ultraviolet-light irradiation to improve dispersibility. On the other hand, the improvement of dispersibility may not be confirmed even though VGCF was irradiated with ultraviolet rays.

Example 3

(Production of Carbon Particle Dispersion Solution)

The five-minute ultraviolet-light irradiation was performed six times for the carbon particles (acetylene black) used in Example 1 in the same manner as Reference Example 1. Added were 5 g of these carbon particles to 300 g of dehydrated ethanol (manufactured by Wako Pure Chemical Industries, Ltd.) and dispersed by an ultrasonic disperser. Thus, a carbon particle dispersion solution was obtained.

(Production of Mixed Solution)

The obtained carbon particle dispersion solution and the coat layer forming solution prepared in Example 1 were mixed and sufficiently stirred to thereby obtain a mixed solution.

(Production of Composite Active Material)

The cathode active material ($LiNi_{1/3}Co_{1/3}Mn_{1/3}O_2$) used in Example 1 was fluidized in a coating apparatus (multiplex MP-01 Mini™, manufactured by Powrex Corp.) to supply the mixed solution in that state. Thus, a precursor layer and the carbon particles were formed on a surface of the active material. Incidentally, the operating conditions of the coating apparatus were the same as Example 1. Thereafter, burning was performed under an air atmosphere on the conditions of 350° C. for 5 hours. Thus, a composite active material was obtained.

(Production of Evaluation Battery)

An evaluation battery was obtained in the same manner as Example 1 except for using the obtained composite active material.

Evaluations 2

(Cross-Sectional Observation)

Figure 9:
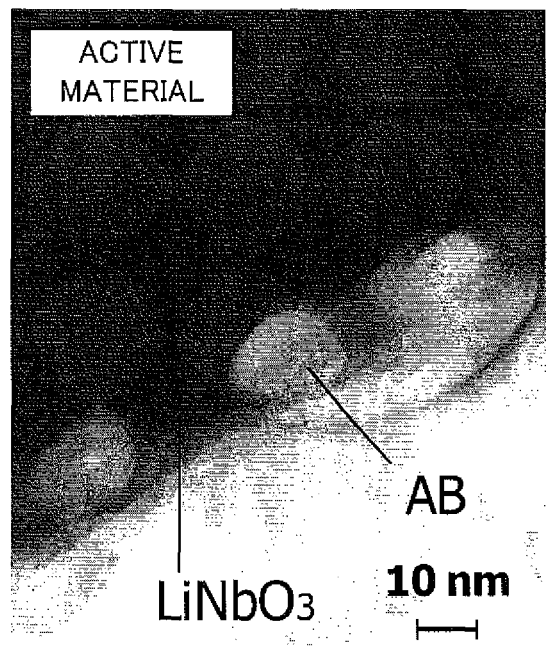
FIG. 9 is a result of cross-sectional observation of a composite active material produced in Example 3.

The cross section of the composite active material produced in Example 3 was observed by TEM. The result is shown in FIG. 9. As shown in FIG. 9, a coat layer and carbon particles penetrating the coat layer were formed on a surface of the active material. The average thickness of the coat layer was 12 nm and the average coverage factor of the coat layer was 89%. In addition, the average length of the carbon particles in the normal direction on a surface of the active material was 26 nm.

(Resistance Measurement)

Figure 10:
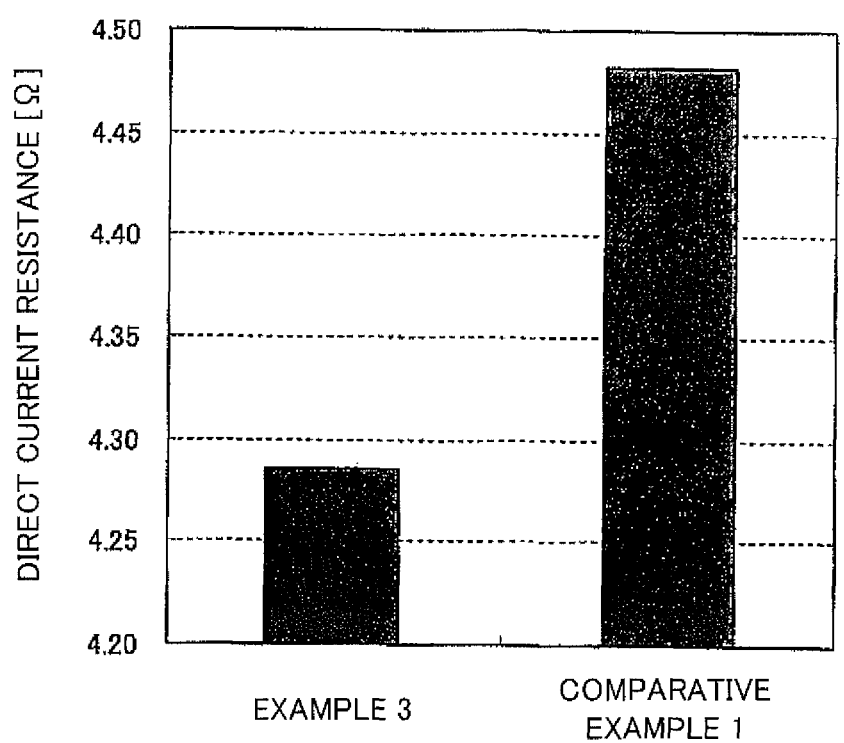
FIG. 10 is a result of resistance measurement of an evaluation battery each obtained in Example 3 and Comparative Example 1.

The direct current resistance of the evaluation battery obtained in Example 3 and Comparative Example 1 was measured. Specifically, the evaluation battery was charged up to a voltage of 4.55 V and subsequently discharged up to a voltage of 2.5 V to thereafter measure direct current resistance at a voltage of 3.6 V. The result is shown in FIG. 10. As shown in FIG. 10, it may be confirmed that Example 3 was lower in direct current resistance than Comparative Example 1.

REFERENCE SIGNS LIST

1 Active material
2 coat layer
3 carbon particles
10 Composite active material
11 cathode active material layer
12 anode active material layer
13 solid electrolyte layer
14 cathode current collector
15 anode current collector
16 battery case
20 solid state battery

The invention claimed is:

1. A solid state lithium battery comprising a cathode active material layer, an anode active material layer, and a solid electrolyte layer formed between the cathode active material layer and the anode active material layer, wherein at least one of the cathode active material layer and the anode active material layer contains a sulfide solid electrolyte material and a composite active material, and the composite active material comprises:

an active material, a coat layer with an average thickness $T_2$ of 1 nm to 15 nm, formed on a surface of the active material and composed of an ion conductive oxide, and a carbon particle having a spherical shape or an elliptic shape, penetrating the coat layer, and formed on the surface of the active material, wherein an average length $T_1$ of the carbon particle in a normal direction on the surface of the active material is 1 nm to 50 nm, a ratio of $T_2/T_1$ is 10% or more, the active material is an oxide active material, and the ion conductive oxide is a Li-containing oxide having lithium ion conductivity.

2. The solid state lithium battery according to claim 1, wherein:

the cathode active material layer contains the composite active material, and at least one of the cathode active material layer and the solid electrolyte layer contains a sulfide solid electrolyte material.

3. The solid state lithium battery according to claim 1, wherein the ion conductive oxide is at least one selected from the group consisting of $LiNbO_3$, $Li_3BO_3$, $LiBO_2$, $Li_2CO_3$, $LiAlO_2$, $Li_4SiO_4$, $Li_2SiO_3$, $Li_3PO_4$, $Li_2SO_4$, $Li_2TiO_3$, $Li_4Ti_5O_{12}$, $Li_2Ti_2O_5$, $Li_2ZrO_3$, $Li_2MoO_4$ and $Li_2WO_4$.

* * * * *